US010166481B2

(12) United States Patent
Liang et al.

(10) Patent No.: US 10,166,481 B2
(45) Date of Patent: Jan. 1, 2019

(54) METHOD, DEVICE AND SYSTEM FOR SHARING OF GAME CHARACTERS

(71) Applicant: Guangzhou Aijiuyou Information Technology Co., Ltd., Guangzhou (CN)

(72) Inventors: Jie Liang, Guangzhou (CN); Shunyan Zhu, Guangzhou (CN); Yong Nie, Guangzhou (CN); Huanwen Chen, Guangzhou (CN)

(73) Assignee: Guangzhou Aijiuyou Information Technology Co., Ltd, Guangzhou (CN)

( * ) Notice: Subject to any disclaimer, the term of this patent is extended or adjusted under 35 U.S.C. 154(b) by 101 days.

(21) Appl. No.: 14/975,073

(22) Filed: Dec. 18, 2015

(65) Prior Publication Data
US 2016/0175707 A1   Jun. 23, 2016

(30) Foreign Application Priority Data

Dec. 19, 2014   (CN) .......................... 2014 1 0808925

(51) Int. Cl.
*A63F 9/24* (2006.01)
*A63F 13/79* (2014.01)
*A63F 13/77* (2014.01)
*A63F 13/71* (2014.01)

(52) U.S. Cl.
CPC .............. *A63F 13/79* (2014.09); *A63F 13/71* (2014.09); *A63F 13/77* (2014.09); *A63F 2300/5546* (2013.01)

(58) Field of Classification Search
None
See application file for complete search history.

(56) References Cited

U.S. PATENT DOCUMENTS

| | | | | |
|---|---|---|---|---|
| 8,663,004 B1 * | 3/2014 | Xu | ........................... | A63F 13/12 463/20 |
| 2003/0224856 A1 * | 12/2003 | Bukovsky | ............... | A63F 13/12 463/42 |
| 2006/0028475 A1 * | 2/2006 | Tobias | ..................... | A63F 13/12 345/473 |

(Continued)

FOREIGN PATENT DOCUMENTS

| | | |
|---|---|---|
| CN | 101156150 A | 4/2008 |
| CN | 101753566 A | 6/2010 |

(Continued)

OTHER PUBLICATIONS

State Intellectual Property Office of the P.R.C., Search Report for Application No. 201410808925.9, dated Feb. 6, 2018, 1 page, China.

(Continued)

*Primary Examiner* — Jason Yen
(74) *Attorney, Agent, or Firm* — Alston & Bird LLP

(57) ABSTRACT

A method for sharing of game characters includes a game management system coupled to a first platform server and a second platform server. The game management system generates a uniform identifier, assigns the uniform identifier to a username that is used by a user to log in the first platform server and the second platform server, and transmits the uniform identifier to a game server. The game server creates or retrieves a game character based upon the uniform identifier.

12 Claims, 5 Drawing Sheets

(56) References Cited

U.S. PATENT DOCUMENTS

Figure 1:
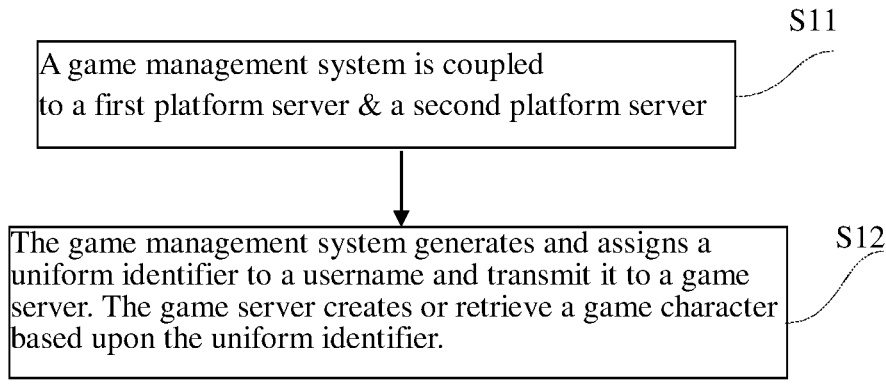

| | | | |
|---|---|---|---|
| 2007/0173332 A1 | 7/2007 | Liu et al. | |
| 2010/0210364 A1* | 8/2010 | York | A63F 13/79 463/43 |
| 2013/0194278 A1* | 8/2013 | Zajac, III | A63F 13/10 345/473 |
| 2013/0316835 A1* | 11/2013 | Takagi | A63F 13/12 463/42 |
| 2014/0160149 A1* | 6/2014 | Blackstock | G06N 3/006 345/619 |

FOREIGN PATENT DOCUMENTS

| | | |
|---|---|---|
| CN | 202652253 U | 1/2013 |
| WO | WO 2007/019759 | 2/2007 |

OTHER PUBLICATIONS

State Intellectual Property Office of the P.R.C., First Office Action for Application No. 201410808925.9, dated Feb. 26, 2018, 20 pages, China.

\* cited by examiner

METHOD, DEVICE AND SYSTEM FOR SHARING OF GAME CHARACTERS

CROSS-REFERENCE TO RELATED APPLICATION

This application claims priority to and the benefit of Chinese Patent Application Serial No. 201410808925.9 filed with the State Intellectual Property Office of P.R. China on Dec. 19, 2014, the content of which is incorporated herein by reference in its entirety.

TECHNICAL FIELD

The example embodiments of the present invention generally relate to mobile Internet, and more particularly to method, device and system for sharing of game characters, such as online game characters or video game characters.

BACKGROUND

Nowadays, more and more users like to play online games. Users may create many game characters during playing. In a typical online game, the process of creating or retrieving a game character may comprise:

Step 1: a user inputs a username and password to log in a game on a client end;
Step 2: the username and password are then sent to a platform server for verification;
Step 3: upon verification, the platform server may generate a token and transmit the token to the client end;
Step 4: the token is then transmitted from the client end to a game server;
Step 5: the token is then transmitted from the game server to the platform server for verification;
Step 6: upon verification, the platform server may assign a user ID to the game server; and
Step 7: the game server then generates a platform number associated with this platform server and creates or retrieves a game character based upon the platform number and the user ID.

In the above process, the game server creates or retrieves the game character based upon the user ID assigned by the platform server and the platform number generated by the game server. Because the game sever may generate a different platform number for a different platform server when one game is coupled to two or more platform servers there may be two or more different platform numbers associated with respective platform server. The game character created based upon one platform number may be different than the one created by using another platform number. The game character in one game may not be shared between different platform servers which may influence user's game experience.

BRIEF SUMMARY

According to one exemplary embodiment of the present invention, a method comprises coupling a game management system to a first platform server and a second platform server, generating a uniform identifier, assigning the uniform identifier to a username that is used by a user to log in the first platform server and the second platform server, and transmitting the uniform identifier to a game server. The method further comprises creating or retrieving, by the game server, a game character based upon the uniform identifier.

According to one exemplary embodiment of the present invention, a game management system for sharing of game characters comprises an interface module configured to access to a first platform server and a second platform server and a processing module configured to assign a uniform identifier to a username that is used by a user to log in a first platform server and a second platform server and transmit the uniform identifier to a game server allowing the game server to create or retrieve a game character based upon the uniform identifier.

According to one exemplary embodiment of the present invention, a game server comprises an information capture module configured to obtain a uniform identifier assigned by a game management system to user information that is used to log in a first platform server and a second platform server after the first platform server and the second platform server are coupled to the game management system and a processing module configured to create or retrieve a game character based upon the uniform identifier.

BRIEF DESCRIPTION OF THE DRAWING(S)

Figure 2:
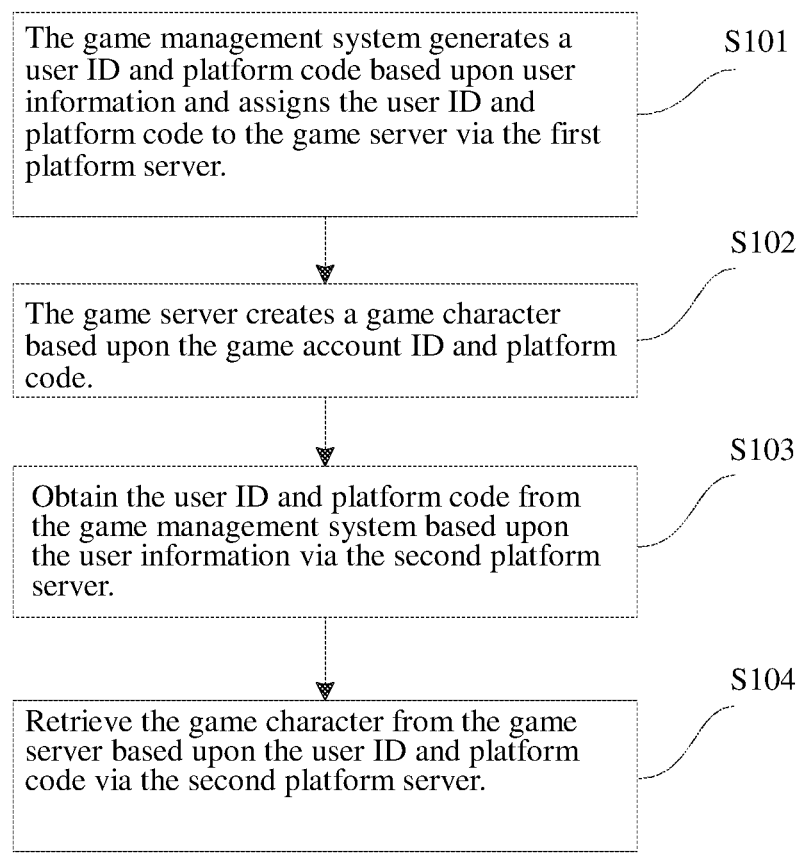
Figure 3:
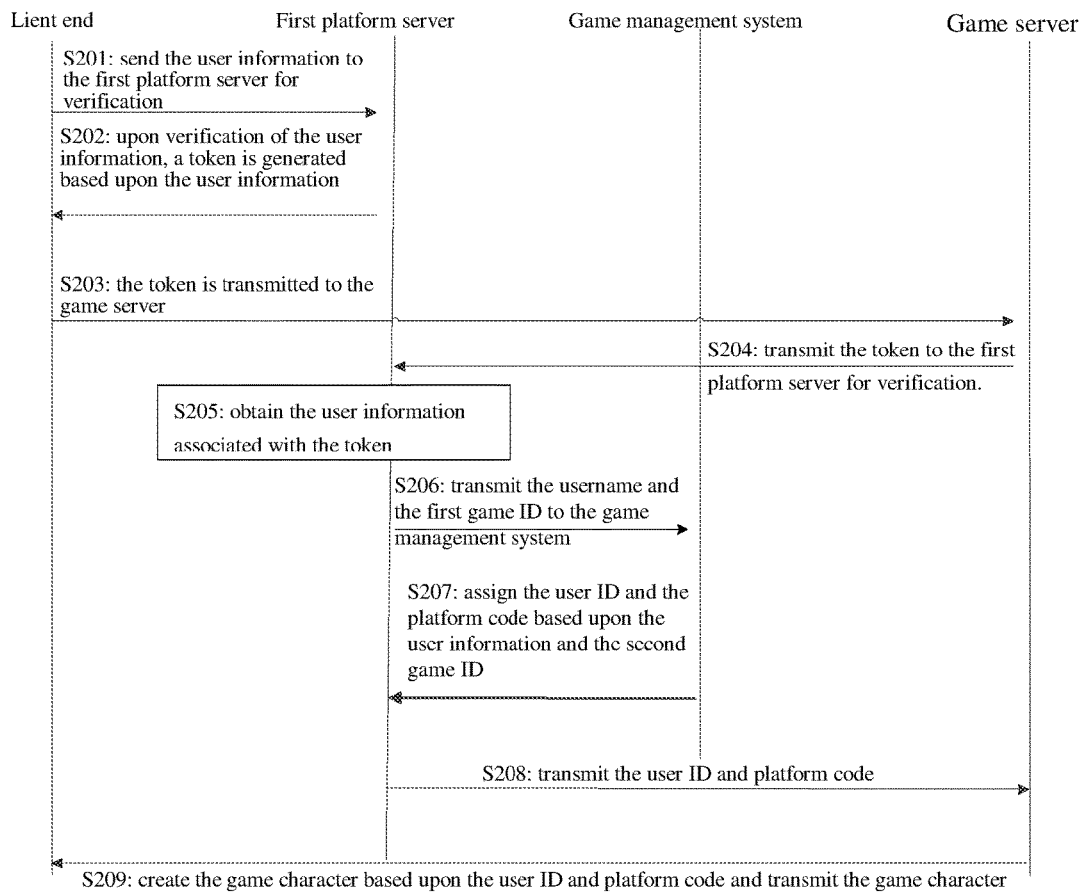
Figure 4:
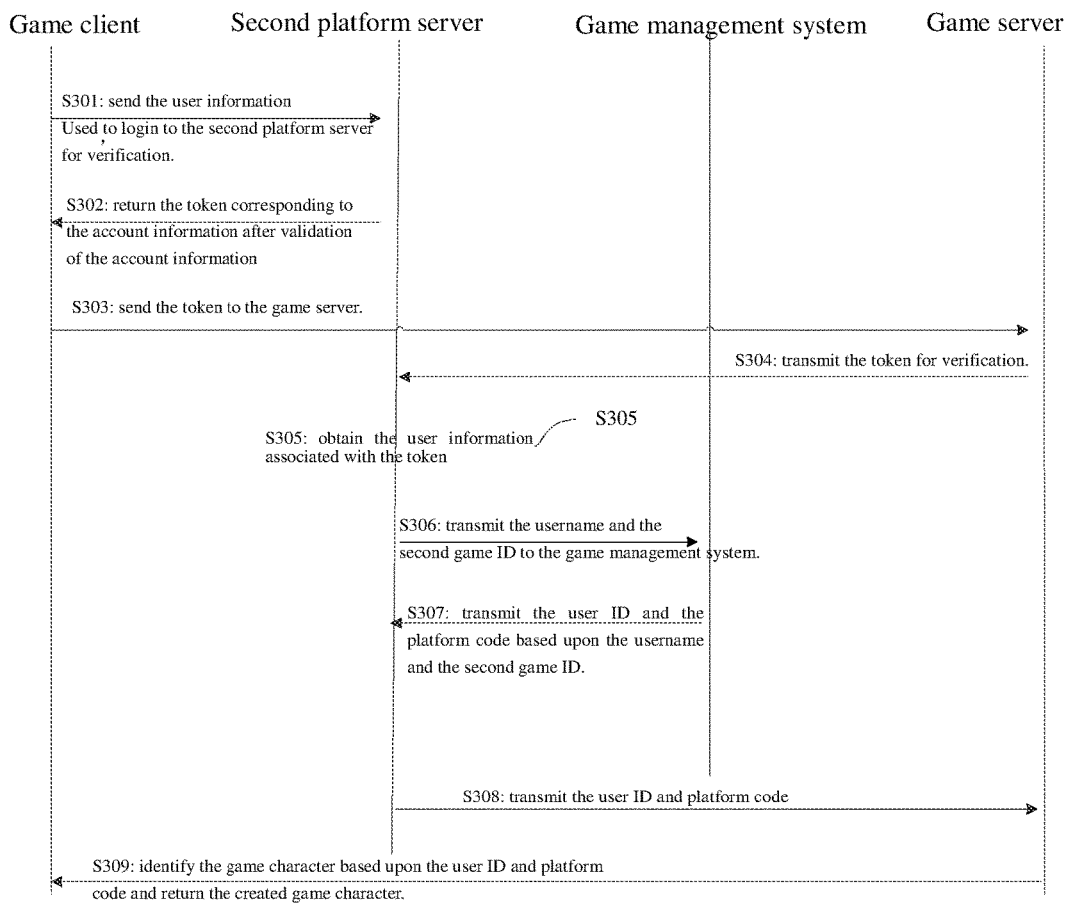
Figure 5:
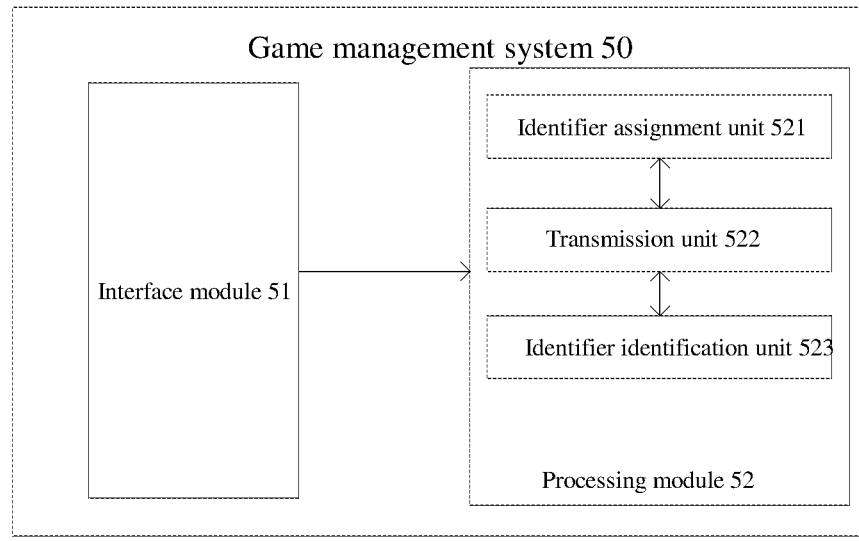
Figure 6:
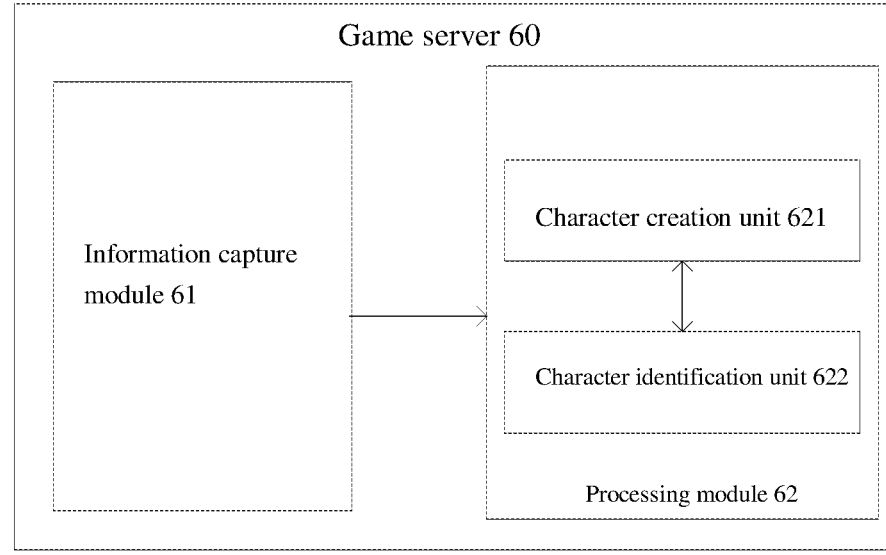
Figure 7:
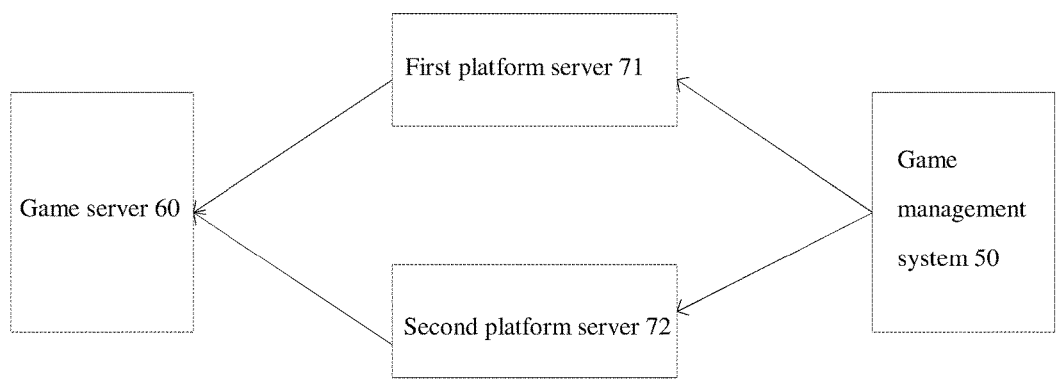

Having thus described the example embodiments of the present invention in general terms, reference will now be made to the accompanying drawings, which are not necessarily drawn to scale, and wherein:

FIG. 1 illustrates a method for sharing of game characters in accordance with one embodiment;
FIG. 2 illustrates a method for sharing of game characters in accordance with another embodiment;
FIG. 3 illustrates an information interchange process among client end, platform server, game server, and a game management system in accordance with one embodiment;
FIG. 4 illustrates an information interchange process among client end, platform server, game server and game management system in accordance with one embodiment;
FIG. 5 illustrates a game management system in accordance with one embodiment;
FIG. 6 illustrates a game server in accordance with one embodiment; and
FIG. 7 illustrates a game system in accordance with one embodiment.

DETAILED DESCRIPTION

The present disclosure now will be described more fully with reference to the accompanying drawings, in which some, but not all embodiments of the disclosure are shown. This disclosure may be embodied in many different forms and should not be construed as limited to the embodiments set forth; rather, these example embodiments are provided so that this disclosure will be thorough and complete, and will fully convey the scope of the disclosure to those skilled in the art. Like numbers refer to like elements throughout. Some technical terms are defined as below:

Release platform: a platform configured to release online games.
Platform server: release platform server, configured to manage usernames which are used to log in the release platform server.
Platform code: a code associated with a platform server. The code may be generated by a game server before the platform server is coupled to the game management system or generated by the game management system after the platform server is coupled to the game management system.

Game ID: a code generated by the release platform and assigned to a game.

User ID: a code generated and assigned by the platform server to a username before the platform server is coupled to a game management system or generated and assigned by the game management system after the platform server is coupled to the game management system.

To address the problem of sharing of game characters, a game management system may be employed. The game management system may be coupled to two or more platform servers and generate and assign a uniform identifier (e.g. user ID and platform code) to the two or more platform servers so as to allow different platform servers to assign to a game server same platform code and user ID for the same online game and allow the game sever to create game characters and retrieve game characters based upon the assigned user ID and platform code, thereby sharing game characters among different platform servers. The online game may be played on a mobile device or a computer.

Sharing of game characters may be realized when one user logs in different platform servers. In the following exemplary embodiments, one user logs in different platform servers playing one game.

FIG. 1 illustrates a method for sharing of game characters in accordance with one embodiment. The method comprises coupling a game management system to a first platform server and a second platform server at step S11. A user may login the first platform server and the second platform server. A uniform identifier may be generated by the game management system and assigned to the user's username at step S12. A game server then creates a game character or retrieve a game character based upon the uniform identifier.

The step S12 may further comprise receiving from the first platform server user's information, such as username and password, generating a uniform identifier and assigning the uniform identifier to the username, and transmitting the uniform identifier to a gamer server via the first platform server. The game server then may create a game character based upon the uniform identifier.

When the user logs in to a second platform server using the same user information, the game management system may receive from the second platform server the user's information and determine the uniform identifier associated with that user. The game management system may then transmit the uniform identifier to the game server via the second platform server. The game server may retrieve the game character which has been created based upon the uniform identifier. The uniform identifier may comprise a user ID and a platform code. The user ID is generated based upon user information and a game ID. The game that is released on the first release platform or the second release platform can be operated on the same operating system or operated on different operating systems. Besides the first and second platform servers, there may be more platform servers coupled to the game server and the game management system.

FIG. 2 illustrates a method for sharing of game characters in accordance with another embodiment. In this embodiment, the uniform identifier may be determined by user ID and platform code. The uniform identifier may also be determined by other information.

The method may comprise generating user ID and platform code, by a game management system, based upon user information and assigning the user ID and the platform code to a game server via the first platform server at step S101. When user logs in the first platform using the user information, such as username and password, the game management system may assign to the game server the user ID and the platform code for creating game characters based upon the user information via the first platform server. The first platform server may be a server of a first release platform. The game coupled to the first platform server may be a first game released by the first release platform.

The method further comprises generating a game character, by the game server, based upon the user ID and platform code at step S102. Generating the game character further comprises generating a game character ID based upon the user ID and platform code. The game character ID is a code associated with the game character and used to identify the game character. The game character ID may be in the form of "user ID+platform code" or "platform code+user ID".

The method further comprises retrieving from the game management system, via the second platform server, the user ID and platform code based upon the same user information at step S103. The method at step S103 further comprises user logging in a second game on the second platform server using the same user information. The game coupled to the second platform server is released by the second release platform. A game that is released by the first release platform and the second release platform concurrently is defined as concurrent game. Upon receipt of the user information, the game management system may identify that the user information has been used to generate the user ID and the platform code and send to the second platform server the user ID and the platform code.

At step S104, the method comprises transmitting the user ID and the platform code, by the game management system, to the game server via the second platform server. The game server then retrieves the created game character from the game server based upon the user ID and platform code.

The user ID and platform code generated in step S104 are the same as the user ID and platform code generated in step S101. In other words, the game management system may assign the same user ID and platform code to the game server regardless of via the first platform server or the second platform server. When the first platform server and the second platform server are coupled to the game management system, the game management system may determine if the user information input on the first platform server and the game the user logged in on the first platform are the same as those on the second platform server. If so, the game management system may assign the same user ID and platform code to the first and second platform servers. When a user logs in the game on the first platform server and creates a game character, the game management system may generate a user ID and a platform code based upon the user's user information and assign the generated user ID and platform code to the game server via the first platform server. The game server may then create a game character based upon the user ID and the platform code. When user logs in the game on the second platform server, the game management system may generate user ID and platform code based upon the user information, transmit to the game server the generated user ID and platform code via the second platform server, and then retrieve game character. The game character may be retrieved by retrieving game character ID using information in the form of "user ID+platform code" or "platform code+user ID." As the game character ID is associated with the game character, retrieving the game character ID is similar to retrieving the game character, thereby achieving sharing of the game character using the same user information when logs in the same online game on different platform servers.

There are two phases for the sharing of a game character from step S101 to step S104: creation of game character and sharing of game character. Take a first platform server and a second platform server as an example. If the user intends to share a game character of the same online game on two platform servers, the user needs to create a game character in the game on the first platform server (the phase of game character creation) so that the user can share the game character in the same game on the second platform server (the phase of game character sharing). In the phase of game character creation, the information interchange among the client end, the first platform server, the game server, and the game management system as shown in FIG. 3.

At step S201, the user information is transmitted from the client end to the first platform server for verification. The user information may comprise username and password. Verification of the user information is to verify whether username and password are matching. At step S202, upon verification the user information by the first platform server, a token associated with the user information may be generated and transmitted to the client end. The process may be terminated when the username does not match the password. At step S203, the token is transmitted from the client end to the game server to enable the user to login the game server using the token. At step S204, the game server may transmit the token to the first platform server for verification. During verification, the first platform may check whether the token is generated by the game server, whether the token expires, and whether the token is secure. Upon verification of all three checks the token is determined to be valid. Failure to pass any of the three checks may invalidate the token.

At step S205, when the token is verified to be a valid token, the first platform server may obtain the user information associated with the token so that the first platform server may obtain username associated with the user information. The process may be terminated if the token is determined to be invalid. At step S206, the first platform may assign a first game ID to the game on the first platform, transmit the username and the first game ID to the game management system. Different platform servers may assign different game IDs to one game. The game management system may associate a game ID assigned by one platform sever (e.g., the first platform sever) to one game with another game ID assigned by another platform server (e.g., the second platform server) to the same game thus allowing the game management system to identify one game associated with different game IDs. For instance, when game A is released on release platform B, the release platform B assigns game ID 123 to game A. When game A is released on release platform C, released platform C assigns game ID 456 to the same game, namely, game A. The game management system may associate the game ID 123 with the game ID 456 and may identify that game A is the game released on both the first platform server and second platform server because game A is associated with both game ID 123 and game ID 456.

At step S207, the game management system may generate a user ID and platform code based upon the username and the first game ID, and then assign the user ID and platform code to the first platform server. Generating and assigning the user ID and platform code may further comprise creating the user ID based upon the username and the first game ID, assigning different platform codes to different platform servers, and then assigning the user ID and the platform code to the first platform server.

At step S208, the first platform server may transmit the user ID and the platform code to the game server. At step S209, the game server may create a game character based upon the user ID and platform code and transmit the game character to the client end. The game character is created by creating a game character ID based upon the user ID and the platform code.

Steps S201-S209 illustrates that the game management system assigns to the game server the user ID and platform code via the first platform server and the game server creates game character based upon the game ID and the platform code. FIG. 4 shows that how to share a created game character based upon an assigned user ID and platform code via the second platform server.

FIG. 4 illustrates an information interchange process among client end, a second platform server, game server and game management system in accordance with one embodiment.

At step S301, the user logs in to client end using the user information, such as username and password. The user information is sent to the second platform server for verification. At Step S302, upon verification of the user information by the second platform server, a token is generated by the second platform server and transmitted back to the client end. If the verification determines the token is invalid, the process may be terminated. At step S303, the token may be transmitted from the client end to the game server. At step S304, the game server may transmit the token to the second platform server for verification. The verification process is similar to the process described in step S204.

At step S305, upon verification of the token, the second platform server may obtain the user information associated with the token. The second platform server may then retrieve the username from the user information. At step S306, the second platform server then assign a second game ID to the game, and transmits the username and the second game ID to the game management system. The first game ID may be associated with the second game ID.

At step S307, the game management system may transmit to the second platform server the user ID and platform code. The user ID and platform code is generated by the game management system based upon the user information and the second game ID at step S207. Upon receipt of the user information and the second game ID, the game management system may identify that a user ID and platform code have been generated based upon this user information and second game ID. The game management system may then transmit the user ID and platform code to the second platform server.

At step S308, the second platform server may transmit the user ID and platform code to the game server. At step S309, the game server may identify the game character that has been created based upon the user ID and platform code and transmit the identified game character to the client end to achieve game character sharing.

The user ID and platform code received by the game server from the second platform server are the same as those received from the first platform server. The user ID and platform are assigned by the game management system. Upon receipt by the game server the user ID and platform code from the first platform server, the game server may create the game character based upon the user ID and platform code. Upon receipt by the game server the user ID and platform code from the second platform server, the game server may identify and retrieve the created game character based upon the user ID and platform code, instead of creating a new game character. The game server may then transmit the retrieved game character to the client end thus allowing the user to share the game character between the first platform server and the second platform server.

Steps S301 to S309 are the data processing steps for creating a game character in steps S201 to S209. When a user logs in an online game on the first platform server, game server may create a game character based upon the user ID and platform code assigned by game management system. When the user logs in the same online game on the second platform server, the game server may retrieve the created game character based upon the user ID and platform code, hence realizing sharing of game character.

In one embodiment, after the first platform server and the second platform server are coupled to the game management system, user may log in game A on the first release platform. For instance, the user may create a game character which reaches a specific level, for example, level 50. The user may log in the same game, namely game A, on the second release platform using the same user information. The user may be able to share the same game character with the same level, for example, level 50 that has been created on the first release platform, thereby realizing sharing of the game character.

In the process described from steps S201 to S209, in an instance in which the game character has been created on the first platform server and the second platform server independently before the first platform server and the second platform server are coupled to the game management system, the user may not be able share the game character. In another instance in which the game character has been created on one of the platform servers, the user may be able to share the created game character on another of the platform servers after the first and the second platform server coupled to the game management system.

The game that is released on the first release platform or the second release platform can be operated on the same operating system or operated on different operating systems. Operating system may refer to Android, IOS or WP on which the game is developed and played. For instance, the first release platform may release game A on Android operating system platform. The second release platform may release the same game A on a different operating system platform, such as IOS. After the first platform server and the second platform server are coupled to the game management system, user may share the game character between the first and second platform server despite they have different operating system platforms. The second release platform may also release game A on the same operating system platform, for instance, Android. User may share the game character after the first platform server and the second platform server are coupled to the game management system.

An embodiment illustrates a process of sharing the game character. In this embodiment, 9game platform and PP assistant platform are employed. Android operating system is employed by the 9game platform. iOS operating system is employed by PP assistant platform. Both 9game platform and PP assistant platform are coupled to the game management system (also called user ID management system). When game A is released on 9game platform and PP assistant platform, the game character is created and retrieved via a uniform identifier. The uniform identifier may be in the form of "platform code+user ID."

The embodiment is described in the following steps:

Step 1: A user may log in game A on 9game Android platform on a first client end using username 888888 and its associated password.

Step 2: 9game server may verify the username 888888 and the password to check if they match. Upon verification, 9game server may generate a token and transmit the token to the first client end.

Step 3: The first client end may then transmit the token to a game server.

Step 4: The game server may transmit the token to 9game server for verification. Upon verification, the game server may retrieve the username associated with the transmitted token. In this embodiment, the username is 888888.

Step 5: 9game server may then send to user ID management system the username 888888 and game ID that is associated with game A. The user ID management system may assign a user ID U666666 to associate with the username 888888 and assign a platform code JY to the 9game Android platform to associate with the user ID. The user ID management system then transmits the platform code JY and U666666 to 9game server. The platform code JY and U666666 may form a uniform identifier.

Step 6: 9game server may then transmit the uniform identifier to the game server.

Step 7: Upon receipt of the platform code JY and the user ID U666666, the game server may create a game character JYU666666 based upon the platform code JY and user ID U666666. The game server then transmits the game character to the first client end.

Step 8: User may log in game A on PP assistant iOS platform on a second client end using username 888888 and its associated password.

Step 9: PP assistant server may verify the username 888888 and its password to check if they match. Upon verification the PP assistant server may then generate a token and transmit the token to the second client.

Step 10: The second client end may then transmit the token to the game server.

Step 11: The game server transmits the token to PP assistant server for verification. Upon verification, the username 888888 associated with the token will be acquired.

Step 12: PP assistant server may then transmit the username 888888 and game ID associated with game A to the user ID management system. The user ID management may identify that username 888888 that has been assigned with user ID U666666 in game A. The user ID management then obtains the platform code JY associated with the user ID U666666 and then transmits the user ID U666666 and the platform code JY to PP assistant server.

Step 13: PP assistant server then transmits the platform code JY and user ID U666666 to the game server.

Step 14: The game server may retrieve the game character JYU666666 that is created at step 7 and transmit it to the second client for sharing.

When more than one platform server are coupled to the game management system, the game management system may assign, via the coupled platform servers, to one username a common user ID and platform code that may be transmitted to the game server. The game server may then create a game character and then retrieve the created game character, hence realizing the sharing of game character between platform servers.

FIG. 5 illustrates a game management system 50 in accordance with one embodiment. As shown in FIG. 5, the game management system 50 comprises an interface module 51 and a processing module 52. The interface module 51 is configured to access a first platform server (e.g., first platform server 71 in FIG. 7) and a second platform server (e.g., second platform server 72 in FIG. 7). The processing module 52 is configured to generate a uniform identifier based upon user's username and assign the uniform identifier to associate with the username that is used to log in the first platform server and the second platform server. The processing module 52 may also be configured to transmit the uniform identifier to a game server, for example game server 60 illustrated in FIG. 6. The game server may then create a game character or retrieve a game character based upon the uniform identifier.

The processing module 52 may further comprise an identifier assignment unit 521, a transmission unit 522, and an identifier identification unit 523. The identifier assignment unit 521 may be configured to assign a uniform identifier to the username based upon the user information. The identifier assignment unit 521 may also generate a user ID based upon the username and game ID and generate the uniform identifier in the form of the game ID and platform code. The transmission unit 522 may be configured to receive user information from the first platform server and the second platform server, transmit the uniform identifier assigned by the identifier assignment unit 521 to the game server via the first platform server. The game server may then create a game character based upon the uniform identifier. The identifier identification unit 523 may be configured to identify the uniform identifier associated with the username that has been used to log in the first second platform server and now is used to log in the second platform serve. If the identifier identification unit 523 determines that the username used to log in the second platform has been assigned a uniform identifier the identifier identification unit 523 may transmit the uniform identifier to the game server via the second platform server. The game server may then retrieve the game character based upon the uniform identifier.

FIG. 6 illustrates a game server in accordance with one embodiment. FIG. 6 illustrates a game server 60. The game server 60 may comprise an information capture module 61 and a processing module 62. The information capture module 61 may be configured to obtain the uniform identifier assigned by a game management system, for example, the game management system 50 illustrated in FIG. 5, associated with a username that is used to log in a first platform server and a second platform server. The processing module 62 may be configured to create a game character or retrieve a game character based upon the uniform identifier.

The processing module 62 may further comprise a character creation unit 621 and character identification unit 622. The character creation unit 621 may be configured to create a game character based upon the uniform identifier upon receipt the uniform identifier by the information capture module 61. Character identification unit 622 may be configured to retrieve the game character based upon the uniform identifier upon receipt the uniform identifier by the information capture module 61 from the game management system. The uniform identifier is identified, by the game management system, to be associated with the username used to log in the second platform server.

FIG. 7 illustrates a game system in accordance with one embodiment. FIG. 7 illustrates a game system 700. The game system 700 may comprises a first platform server 71, a second platform server 72, the game management system 50 (shown in FIG. 5), and the game server 60 (shown in FIG. 6). The first platform server 71 and the second platform server 72 are coupled to the game management system 50. The game management system 50 may assign a uniform identifier to the username that is logged in the first platform server 71 and the second platform server 72 and transmit the uniform identifier to the game server 60. The game server 60 may be configured to create a game character or retrieve a game character based upon the uniform identifier. To avoid redundant, detailed description of the game management system 50 refers to FIG. 5. Detailed description of game server 60 refers to FIG. 6.

A method, a device and/or a system for sharing of game characters have been described. One or more platform servers may be coupled to a game management system. The game management system may assign the same platform code and user ID to different platform servers on which the user logs in. The game server may create a game character and retrieve the created game character based upon the platform code and the user ID, allowing the user to share a game character on different platform servers. The method may be executed on a mobile terminal. The mobile terminal may be a handheld terminal device with a Bluetooth interface. The handheld terminal device may be a cell phone or PDA. The method may be implemented by a computer program stored in a storage of a mobile terminal and executed by a processor of the mobile terminal. The processor may comprise central processing unit or a control unit. The storage may comprise a computer-readable media or a computer-readable storage device.

The embodiments described above are some exemplary embodiments. However, it is to be understood that the scope of protection shall not be limited thereby. Those skilled in the art may easily figure out any modification or equivalence within the technical scope of this invention. Such modification or substitution shall also be included in the scope of protection of this invention. Therefore, the scope of protection of this invention stated in the claims shall be applicable.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

Many modifications and other example embodiments set forth herein will come to mind to one skilled in the art to which these example embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A computer-implemented method for sharing of game characters, comprising:
 coupling a game management system to a first platform server and a second platform server;

receiving, from the first platform server, user information that is used to log in the first platform server, wherein the user information comprises a username and a password;

generating, by the game management system, a uniform identifier, assigning, by the game management system, the uniform identifier to the username that is associated with the user information, transmitting, via the first platform server and by the game management system, the uniform identifier to a game server;

creating, by the game server, a game character based upon the uniform identifier;

receiving, from the second platform server, the user information, wherein the second platform server is separated from the first platform server;

generating, by the second platform server, a second token based on the received user information;

identifying, by the game management system, the uniform identifier associated with the user information based on the second token;

transmitting, via the second platform server and by the game management system, the uniform identifier to the game server; and retrieving, by the game server, the game character based upon the uniform identifier.

2. The computer-implemented method of claim 1, wherein the uniform identifier comprises a user ID and a platform code.

3. The computer-implemented method of claim 1, wherein a game that is released on the first platform server or the second platform server can be operated on a same operating system.

4. The computer-implemented method of claim 1, wherein a game that is released on the first platform server or the second platform server can be operated on different operating systems.

5. The computer-implemented method of claim 1, wherein the user information used to log in the first platform server is used to log in the second platform server.

6. The computer-implemented method of claim 1, further comprises generating a user ID based upon the username and a game ID.

7. The computer-implemented method of claim 1, further comprising
receiving the user information by the first platform server from a first client end,
verifying the user information,
generating a first token based upon the user information,
transmitting the first token to the first client end,
transmitting, by the first client, the first token to the game server,
transmitting, by the game server, the first token to the first platform server for verification,
transmitting, by the first platform server, the first token to the game management system upon verification.

8. A game management system for sharing of game characters, the system comprising:
an interface module, configured to access a first platform server and a second platform server, wherein the first platform server is separated from the second platform server;
a processing module, configured to assign a uniform identifier to a username associated with the user information that is used by a user to log in a first platform server and a second platform server, generate one or more tokens based on the user information, and transmit the uniform identifier to a game server allowing the game server to create or retrieve a game character based upon the uniform identifier;
an identifier assignment unit, configured to assign the uniform identifier to the username based upon user information that is used to log in the first platform server;
a transmission unit, configured to receive the user information and transmit, via the first platform server, the uniform identifier to the game server to enable the game server to create a game character based upon the uniform identifier; and
an identifier identification unit, configured to identify the uniform identifier associated with the user information received by the second platform server based on a token generated by the second platform server, and transmit, via the second platform server, the identified uniform identifier to the game server to enable the game server to retrieve the created game character based upon the uniform identifier.

9. The game management system of claim 8, wherein the identifier assignment unit configured to generate a user ID based upon the username and game ID and wherein the uniform identifier is generated in the form of the game ID and the platform code.

10. A game server, comprising:
an information capture module, configured to obtain a uniform identifier assigned by a game management system to user information that is used to log in a first platform server and a second platform server after the first platform server and the second platform server are coupled to the game management system;
a processing module, configured to create or retrieve a game character based upon the uniform identifier;
a character creation unit, configured to generate a game character based upon the uniform identifier upon receipt of the uniform identifier by the information capture module from the first platform server; and
a character identification unit, configured to retrieve the game character based upon the uniform identifier, wherein the game management system is configured to identify the uniform identifier associated with the user information based on a token generated by the second platform server.

11. A game system comprising a first platform server, a second platform server, a game management system, a game server, an interface module, and a processing module:
the first platform server and second platform server are coupled to the game management system;
the game management system configured to generate a uniform identifier, assign the uniform identifier to a username used to log in the first platform server and the second platform server, and transmit the uniform identifier to the game server;
the game server configured to create a game or retrieve a based upon the uniform identifier;
the interface module configured to access the first platform server and a second platform server;
the processing module further comprises:
an identifier assignment unit, configured to assign the uniform identifier to the username based upon user information that is used to log in the first platform server;
a transmission unit, configured to receive the user information and transmit, via the first platform server, the uniform identifier to the game server to enable the game server to create a game character based upon the uniform identifier; and an identifier identification unit, configured to identify the uniform identifier associated with the user information received by the second platform server based on a token generated by the second platform server, and transmit, via the second platform server, the identified uniform identifier to the game server to enable the game server to retrieve the created game character based upon the uniform identifier.

12. The game system of claim 11, wherein the game server comprises an information capture module and a processing module:

an information capture module, configured to obtain a uniform identifier assigned by the game management system to user information that is used to log in the first platform server and the second platform server after the first platform server and the second platform server are coupled to the game management system; and a processing module, comprises:

a character creation unit, configured to generate the game character based upon the uniform identifier upon receipt of the uniform identifier by the information capture module from the first platform server; and a character identification unit, configured to retrieve the game character based upon the uniform identifier, wherein the game management system is configured to identify the uniform identifier associated with the username that has been used to log in the first second platform server and now is used to log in the second platform server.

* * * * *